United States Patent
Chen et al.

(10) Patent No.: US 6,362,028 B1
(45) Date of Patent: Mar. 26, 2002

(54) METHOD FOR FABRICATING TFT ARRAY AND DEVICES FORMED

(75) Inventors: Jr-Hong Chen; Tinghui Huang, both of Hsin-Chu (TW)

(73) Assignee: Industrial Technology Research Institute, HsinChu (TW)

( * ) Notice: Subject to any disclaimer, the term of this patent is extended or adjusted under 35 U.S.C. 154(b) by 0 days.

(21) Appl. No.: 09/377,584

(22) Filed: Aug. 19, 1999

(51) Int. Cl.[7] .............................................. H01L 21/00

(52) U.S. Cl. .......................... 438/149; 438/159; 257/59

(58) Field of Search .......................... 438/149, 30, 159, 438/597, 233; 257/32, 59, 72

(56) References Cited

U.S. PATENT DOCUMENTS

| | | | | |
|---|---|---|---|---|
| 4,774,207 A | * | 9/1988 | Possin | 438/597 |
| 5,153,754 A | * | 10/1992 | Whetten | 349/147 |
| 5,780,871 A | * | 7/1998 | den Boer et al. | 257/59 |
| 5,917,564 A | * | 6/1999 | Kim et al. | 349/46 |
| 5,994,721 A | * | 11/1999 | Zhong et al. | 257/89 |
| 6,011,274 A | * | 1/2000 | Gu et al. | 257/59 |
| 6,020,590 A | * | 2/2000 | Aggas et al. | 250/370.09 |
| 6,057,896 A | * | 5/2000 | Rho et al. | 349/42 |
| 6,060,714 A | * | 5/2000 | Zhong et al. | 250/370.09 |

* cited by examiner

Primary Examiner—Trung Dang
Assistant Examiner—Brook Kebede
(74) Attorney, Agent, or Firm—Tung & Associates

(57) ABSTRACT

A method for fabricating a BCE type TFT array by using reduced number of masks and devices formed are disclosed. In the method, only five masks are required for forming the BCE type TFT array which is less than that normally required in a typical TFT fabrication process, i.e., at least six masks. The five masks required in the present invention process are a first mask for gate busline patterning, a second mask for island and S/D data line patterning, a third mask for the data line, TFT channel and $C_{st}$ patterning, a fourth mask for the passivation layer patterning and a fifth mask for the conductive electrode layer patterning. The present invention novel method produces a TFT that has improved contact resistance between the S/D metal and the $n^+$ amorphous silicon layer. The improved contact resistance is achieved by an immediate deposition process of a S/D metal thin film after the deposition of the $n^+$ amorphous silicon layer such that any exposure of the interface to chemical contaminants and native oxide is substantially reduced or eliminated. The present invention novel method further provides the benefit that the Metal 2 layer shields the TFT island structure from plasma damages and residual photoresists resulting in a TFT array structure of improved reliability.

10 Claims, 6 Drawing Sheets

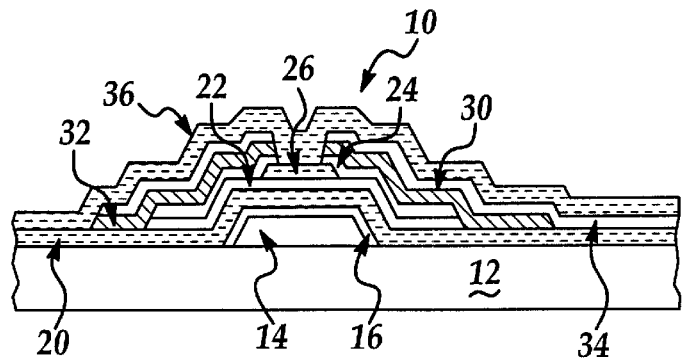

*Figure 1*
*Prior Art*

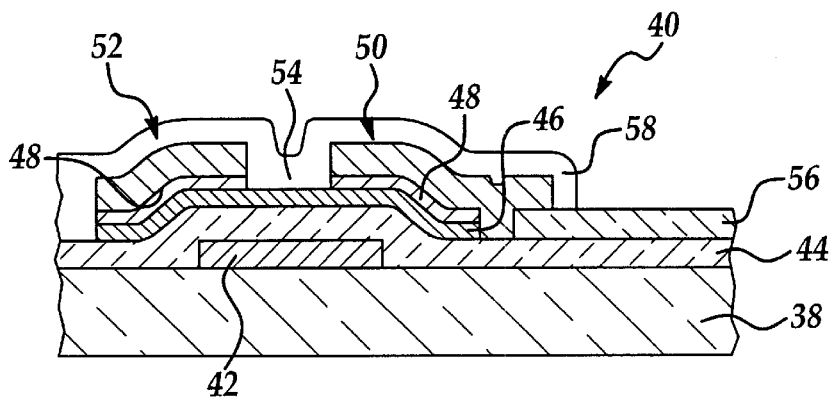

*Figure 2*
*Prior Art*

| MATERIAL/FEATURE | PROCESS |
|---|---|
| Gate definition | |
| Mo-Ta<br>1st masking step | Sputter<br>Photolithography, etching |
| a-Si island definition | |
| SiO/SiN/a-Si(i)/a-Si(n*)<br>2nd masking step | Plasma CVD<br>Photolithography, etching |
| Display electrode formation | |
| ITO deposition<br>3rd masking step | Sputter<br>Photolithography, etching |
| Thru-hole formation | |
| 4th masking step | Photolithography, etching |
| Source/Drain/Signal Line definition | |
| Mo-Al deposition<br>5th masking step | Sputter<br>Photolithography, etching |
| Back Channel definition | |
| n* a-Si etching | Wet, dry etching |
| Passivation | |
| Mo-Al deposition<br>5th masking step | Plasma CVD<br>Photolithography, etching |
| Array Completed | |

*Figure 3*

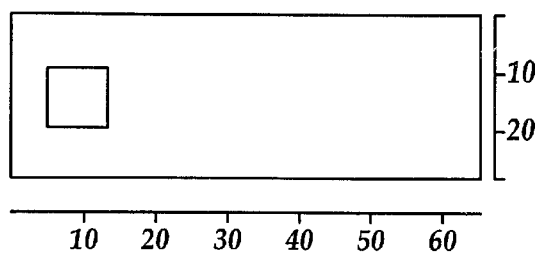
*Figure 5A*
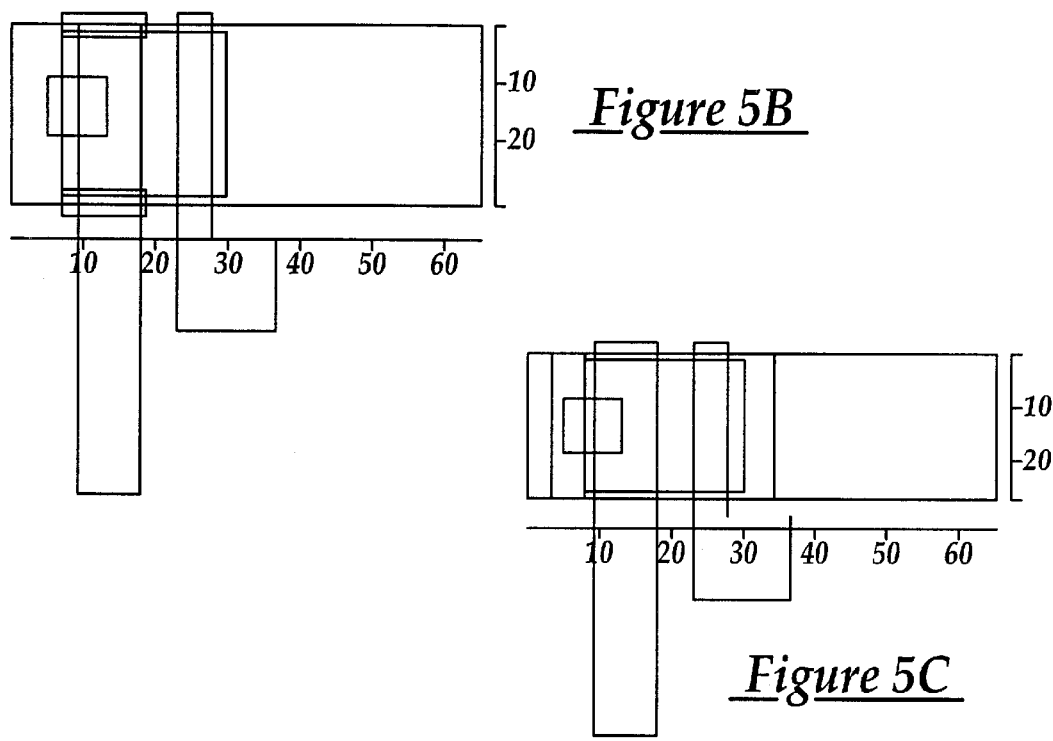
*Figure 5B*
*Figure 5C*
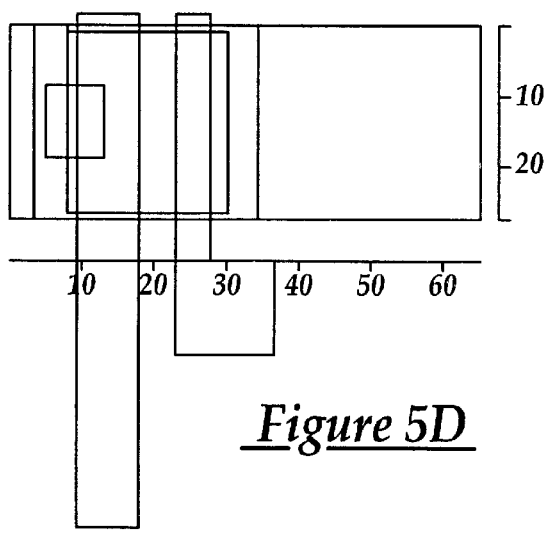
*Figure 5D*

METHOD FOR FABRICATING TFT ARRAY AND DEVICES FORMED

FIELD OF THE INVENTION

The present invention generally relates to a method for fabricating a thin film transistor (TFT) array for use as a switching device in a liquid crystal display (LCD) and devices formed and more particularly, relates to a method for fabricating a TFT array by an improved fabrication process which only requires five photomasks utilizing an island metal masking structure for achieving improved contact resistance between source/drain metal and n+ doped amorphous silicon layer and devices fabricated by such method.

BACKGROUND OF THE INVENTION

In recent years, large liquid crystal cells have been used in flat panel displays. The liquid crystal cells are normally constructed by two glass plates joined together with a layer of a liquid crystal material sandwiched inbetween. The glass substrates have conductive films coated thereon with at least one of the substrates being transparent. The substrates are connected to a source of power to change the orientation of the liquid crystal material. A possible source of power is a thin film transistor that is used to separately address areas of the liquid crystal cells at very fast rates. The TFT driven liquid crystal cells can be advantageously used in active matrix displays such as for television and computer monitors.

As the requirements for resolution of liquid crystal monitors increase, it becomes desirable to address a large number of separate areas of a liquid crystal cell, called pixels. For instance, in a modern display panel, more than 3,000,000 pixels may be present. At least the same number of transistors must therefore be formed on the glass plates so that each pixel can be separately addressed and left in the switched state while other pixels are addressed.

Thin film transistors are frequently made with either a polysilicon material or an amorphous silicon material. For TFT structures that are made of amorphous silicon material, a common structure is the inverted staggered type which can be back channel etched or tri-layered. The performance of a TFT and its manufacturing yield or throughput depend on the structure of the transistor. For instance, the inverted staggered back channel etched TFT can be fabricated with a minimum number of six masks, whereas other types of inverted staggered TFT require a minimum number of nine masks. The specification for a typical inverted staggered back channel etched TFT includes an amorphous silicon that has a thickness of 3,000 Å, a gate insulator of silicon nitride or silicon oxide, a gate line of Mo/Ta, a signal line of Al/Mo and a storage capacitor. The requirement of a thick amorphous silicon layer in the TFT device is a drawback for achieving a high yield fabrication process since deposition of amorphous silicon is a slow process. A major benefit for the amorphous silicon TFT is its low leakage current which enables a pixel to maintain its voltage. On the other hand, an amorphous silicon TFT has the drawback of a low charge current (or on current) which requires an excessive amount of time for a pixel to be charged to its required voltage.

A second type of TFT is made by using a polysilicon material. Polysilicon is more frequently used for displays that are designed in a smaller size, for instance, up to three inch diagonal for a projection device. At such a small size, it is economical to fabricate the display device on a quartz substrate. Unfortunately, large area display devices cannot be normally made on quartz substrates. The desirable high performance of polysilicon can therefore be realized only if a low temperature process can be developed to enable the use of non-quartz substrates. For instance, in a more recently developed process, large area polysilicon TFT can be manufactured at processing temperatures of less than 600° C. In the process, self-aligned transistors are made by depositing polysilicon and gate oxide followed by source/drain regions which are self-aligned to the gate electrode. The device is then completed with a thick oxide layer, an ITO layer and aluminum contacts.

Polysilicon TFTs have the advantage of a high charge current (or current) and the drawback of a high leakage current. It is difficult to maintain the voltage in a pixel until the next charge in a polysilicon TFT due to its high leakage current. Polysilicon also allows the formation of CMOS devices, which cannot be formed by amorphous silicon. For the fabrication of larger displays, a higher mobility may be achieved by reducing the trap density around the grain boundaries in a hydrogenation process.

FIG. 1 shows an enlarged, cross-sectional view of a conventional amorphous silicon TFT structure. Amorphous TFT 10 is built on a low cost glass substrate 12. On top of the glass substrate 12, a gate electrode 14 is first deposited of a refractory metal such as Cr, Al or Al alloy and then formed. A gate insulating layer 16 is normally formed in an oxidation process. For instance, a high density $TaO_x$ on a Ta gate can be formed to reduce defects such as pin holes and to improve yield. Another gate insulating layer 20 is then deposited of either silicon oxide or silicon nitride. An intrinsic amorphous silicon layer 22 is then deposited with a n+ doped amorphous silicon layer 24 deposited on top to improve its conductivity. Prior to the deposition of the doped amorphous silicon layer 24, an etch stop 26 is first deposited and formed to avoid damages to the amorphous silicon layer 22 in a subsequent etch process for a contact hole. The doped amorphous silicon layer 24 is formed by first depositing the amorphous silicon layer in a chemical vapor deposition process and then implanting ions in an ion implantation process. Boron ions are normally used to achieve n+ polarity. A drain region 30 and a source region 32 are then deposited and formed with a pixel electrode layer 34 of ITO (indium-tin-oxide) material deposited and formed on top. The drain region 30 and the source region 32 are normally deposited of a conductive metal layer. A suitable conductive metal may be a bi-layer of Cr/Al. The structure is then passivated with a passivation layer 36.

A second conventional inverted staggered type TFT 40 is shown in FIG. 2. The TFT 40 is frequently called the back channel etched (BCE) type inverted staggered TFT. A gate electrode 42 is first formed on a non-conducting glass substrate 38. The gate electrode 42 is connected to a gate line (not shown) laid out in the row direction. A dielectric material layer 44 of either silicon oxide or silicon nitride is used to insulate the gate electrode 42. After an amorphous silicon layer 46 and a contact layer 48 are sequentially deposited, patterned and etched, source electrode 50 and drain electrode 52 are formed to provide a channel 54 in-between the two electrodes, hence the name back channel etched TFT, The source electrode 50 of each TFT is connected to a transparent pixel electrode 56 independently formed in the area surrounded by the gate lines and the drain lines (not shown). A transparent passivation layer 58 formed of a material such as silicon nitride is deposited on the completed structure.

As shown in FIG. 2, the gate electrode 42 is frequently formed of chromium or other similar metals on the transparent glass substrate 38. The dielectric layer 44 of gate oxide or silicon nitride is formed to insulate the upper surface of the glass substrate 38 including the top surface of the gate electrode 42. A semi-conducting layer 46, which may be formed of amorphous silicon is stacked on the dielectric film 44 over the gate electrode 42. The drain electrode 52 and the source electrode 50 are formed on the semi-conducting film 46 and are separated from each other by a predetermined distance forming the channel section 54. The two electrodes each has a contact layer of 48 and a metal layer which are electrically connected to the semi-conducting layer 46. The transparent electrode 44 may be formed of ITO.

A typical process flow chart for forming a back channel etched inverted staggered TFT is shown in FIG. 3. It is seen that, in a typical fabrication process for a BCE inverted staggered TFT, a total number of six photomasks is required which includes a first mask for gate definition or Metal 1; a second mask for the amorphous silicon island definition or for isolation; a third mask for the display electrode formation or for ITO definition; a fourth mask for through-hole formation or for contact hole definition; a fifth mask for source/drain/signal line definition or for Metal 2 definition; and a sixth mask for the passivation layer definition. The conventional fabrication process for a BCE type inverted staggered TFT is therefore complicated and problem prone. For instance, the formation of the ITO layer is difficult to control which leads to either over-etching or residue problems due to the adverse effect of an etched silicon nitride layer used as the bottom layer. The ITO etchant, such as an acid, may leak through and thus cause damages to the Metal 1 layer. A broken wire or wire open defect in the Metal 2 layer further affects the process yield. The broken wire defect is most likely caused by the photoresist residue in the previous etching processes for Metal 1, isolation, ITO and contact hole. A problem of island step coverage, e.g., at cross-over, further affects the Metal 2 broken wire defect.

In the conventional process, the active TFT island is difficult to protect from plasma damages, specifically, when oxygen plasma ashing is used in forming the isolation layer, the ITO layer and the contact layer. The alignment problem between layers may further cause quality issues such as in a storage capacitor, i.e., $C_{st}$ mis-alignment caused by the Metal 1/ITO alignment issue results in larger deviation of feed-through. Similarly, $C_{gs}$ misalignment caused by Metal 1/Metal 2 alignment issue also results in larger deviation of feed-through. The conventional TFT process therefore is not capable of producing high aperture ratio and low contact resistance between the source/drain metal and the $n^+$ amorphous silicon layer. Furthermore, the conventional BCE TFT fabrication process cannot produce TFT array at low cost, high throughput, TFT with stable image quality (from stable $C_{st}$ and $C_{gs}$ structures), high yield and high aperture ratio properties.

It is therefore an object of the present invention to provide a method for forming BCE type TFT array that does not have the drawbacks or shortcomings of the conventional fabrication methods for BCE TFT.

It is another object of the present invention to provide a method for fabricating BCE type TFT array by utilizing reduced number of photomasking steps.

It is a further object of the present invention to provide a method for fabricating BCE type TFT array that only requires five masking steps for gate busline, source/drain metal definition, back channel and $C_{st}$ opening, passivation patterning and transparent electrode patterning.

It is another further object of the present invention to provide a method for fabricating BCE type TFT array that produces TFT array having improved contact resistance between source/drain metal and $n^+$ amorphous silicon layer.

It is still another object of the present invention to provide a method for fabricating BCE type TFT array wherein the TFT island is protected by the Metal 2 layer during the fabrication process from plasma damages.

It is yet another object of the present invention to provide a method for fabricating BCE type TFT array which eliminates the deposition of chemical contaminants and native oxide on a $n^+$ amorphous silicon layer prior to the deposition of a metal mask layer.

It is still another further object of the present invention to provide a method for fabricating BCE type TFT array by first depositing a metal mask layer and then a Metal 2 layer on top in forming the source/drain metals.

It is yet another further object of the present invention to provide a BCE type TFT array that has improved contact resistance between source/drain metal and $n^+$ doped amorphous silicon layer resulting from an immediate metal mask deposition after the formation of the $n^+$ doped amorphous silicon layer.

SUMMARY OF THE INVENTION

In accordance with the present invention, a method for fabricating a BCE type TFT array by using reduced number of photomasks and devices formed by such method are provided.

In a preferred embodiment, a method for fabricating a TFT array with reduced number of masks can be carried out by the operating steps of providing a substantially transparent ceramic panel, sputter depositing a first metal layer on the ceramic panel, forming a plurality of gate buslines on the panel with a first mask, depositing sequentially a gate nitride layer, an intrinsic amorphous silicon layer and an $n^+$ doped amorphous silicon layer on top of the plurality of gate buslines, sputter depositing a metal mask layer for source/drain metal on the $n^+$ doped amorphous silicon layer, patterning and forming a TFT island and source/drain data lines simultaneously by a second mask, sputter depositing a second metal layer on top of the metal mask layer, patterning data line, TFT channel and a storage capacitor by a third mask, etching a plurality of back channels, depositing a passivation layer and patterning the layer by a fourth mask, and sputter depositing a substantially transparent conductive electrode layer on top of the passivation layer and patterning electrodes by a fifth mask.

In the method for fabricating TFT array with reduced number of masks, the total number of masks required is not more than 5. The metal mask layer is sputter deposited immediately after the deposition of the $n^+$ doped amorphous silicon layer before the $n^+$ doped amorphous silicon layer is exposed to chemical contaminants or forms native oxide. The method may further include the step of providing a glass panel for depositing a plurality of gate buslines on top. The metal mask layer may be sputter deposited of a material selected from the group consisting of Al, Cu, Mo, Ti, V and Cr. The second metal layer may be sputter deposited of a bi-layer selected from the group consisting of Al/Cu. Al/Mo, Al/Ti, Al/V and Al/Cr. The plurality of gate buslines forms scan lines and is deposited of a bi-layer of about 2,000 Å Cr and about 2,000 Å Al. The metal mask layer and the second metal layer form data lines and are deposited of about 500 Å Cr and about 6,000 Å Al bi-layer. The passivation layer may be deposited of a material selected from SOG, BPSG and PSG. The conductive electrode layer may be deposited of indium-tin-oxide.

The present invention is further directed to a thin film transistor that has improved contact resistance between the source/drain (S/D) metal and n+ doped amorphous silicon which includes a substantially transparent glass panel, a plurality of gate buslines on the panel, a gate insulation layer overlying the gate buslines, and n+ doped amorphous silicon layer on the gate insulation layer, source/drain metals formed of a metal on the n+ doped amorphous silicon layer with an interface therebetween, the interface being substantially without chemical contaminants and native oxide thus providing improved contact resistant between the S/D metal and the n+ doped amorphous silicon, a passivation layer overlying and insulating the source/drain metal, and an electrode layer overlying the passivation layer.

In the thin film transistor that has improved contact resistance between S/D metal and n+ doped amorphous silicon, the improved contact resistance is between about 0.5 $\Omega$-cm$^2$ and about $10^{-3}$ $\Omega$-cm$^2$. The electrode layer may be formed of a substantially transparent material which includes ITO. The plurality of gate buslines forms scan lines and is deposited of a bi-layer material selected from the group consisting of Al/Cr, Al/Cu, Mo/W, Al/Ti, Al/V and Al/Mo. The source/drain metals are formed of a bi-layer material selected from the group consisting of Al/Cu, Al/Cr and Al/Mo. The plurality of gate buslines has a thickness between about 500 Å and about 10,000 Å, or a thickness of about 2,000 Å Cr and about 2,000 Å Al. The source/drain metals are formed of a thickness between about 2,000 Å and about 12,000 Å, preferably between about 4,000 Å and about 8,000 Å. The thin film TFT may further include an intrinsic amorphous silicon layer between the gate insulation layer and the n+ doped amorphous silicon layer.

BRIEF DESCRIPTION OF THE DRAWINGS

These and other objects, features and advantages of the present invention will become apparent from the following detailed description and the appended drawings in which:

FIG. 1 is an enlarged, cross-sectional view of a conventional inverted staggered tri-layered TFT.

FIG. 2 is an enlarged, cross-sectional view of a conventional inverted staggered back channel etched TFT.

FIG. 3 is a process flow chart for the conventional inverted staggered back channel etched TFT fabrication process.

FIGS. 5A–5E are plane views of the mask layouts utilized in the present invention TFT array fabrication process.

DETAILED DESCRIPTION OF THE PREFERRED EMBODIMENT

The present invention discloses a method for fabricating a BCE type TFT array with reduced number of photomasks required for the fabrication process and the devices formed by such fabrication method.

The present invention fabrication method only requires five photomasks, when compared to a conventional TFT fabrication process which requires at least six masking processes including that for the Metal 1 layer, the insulation layer, the ITO layer, the contact layer, the Metal 2 layer and the passivation layer. Contrary to the conventional process, the only masks required for the present invention fabrication method is the gate busline mask, the TFT island and S/D data line masks, the TFT back channel opening mask, the passivation patterning mask and the transparent electrode layer mask.

In the present invention novel process, after the gate insulation layer/intrinsic amorphous silicon layer/n+ amorphous silicon layer are sequentially deposited, a S/D metal thin film, or a metal mask layer is immediately sputtered onto the n+ amorphous silicon layer such that the latter surface is not exposed to chemical contaminants or susceptible to the formation of native oxide. The present invention novel fabrication process therefore enables an improved contact resistance between the S/D metal layer and the n+ amorphous silicon layer since no contaminants exists at such interface between the two layers. To the contrary, in a conventional TFT fabrication process, the n+ amorphous silicon layer requires a cleaning, or an etching process, to etch away a surface layer of contaminants (include native oxide) prior to the deposition of the Metal 2 layer for the S/D metal formation. The difficulty in achieving a clean interface between the two layers leads to large contact resistance and thus inferior properties of the TFT produced by the conventional method.

A further benefit provided by the present invention novel method is that the TFT island is formed by an island metal masking structure by first forming an island and S/D data lines with a second mask, and then depositing an upper metal layer (the Metal 2 layer) by sputtering. The Metal 2 layer is then patterned into data lines, TFT back channel opening and the $C_{st}$ structure by using a third mask. In the present invention method, the Metal 2 layer is therefore only affected by any residual photoresist that is on top of the island, instead of being affected by all the previous layers of photoresist materials (approximately 4–5 layers). This minimizes the Metal 2 open defect since void formation in the Metal 2 layer is greatly reduced or eliminated.

Still another further benefit provided by the present invention novel method is that the TFT island is protected from exposure to plasma, especially oxygen plasma since it is covered by the Metal 2 layer through the various plasma ashing processes.

Figure 4A:
FIGS. 4A–4E are enlarged, cross-sectional views of the present invention BCE type TFT array illustrating the fabrication steps.

Referring now to FIG. 4A wherein an enlarged, cross-sectional view of the present invention apparatus 10 is shown. The TFT array 10 is built on a substantially transparent ceramic panel 12, such as a glass panel with gate buslines 14 built thereon. The gate buslines 14 are formed by first depositing a Metal 1 layer (not shown) on the glass surface and then patterning by a first mask and etching into the gate buslines 14. The metallic material used to form the gate buslines, or by metal mask and Metal 1 layer, may be suitably a Mo/Ta, Mo/W bi-layer metal, or a Al/Cr metal. A typical structure of the gate buslines is about 2,000 Å Cr and about 2,000 Å Al.

Figure 4B:
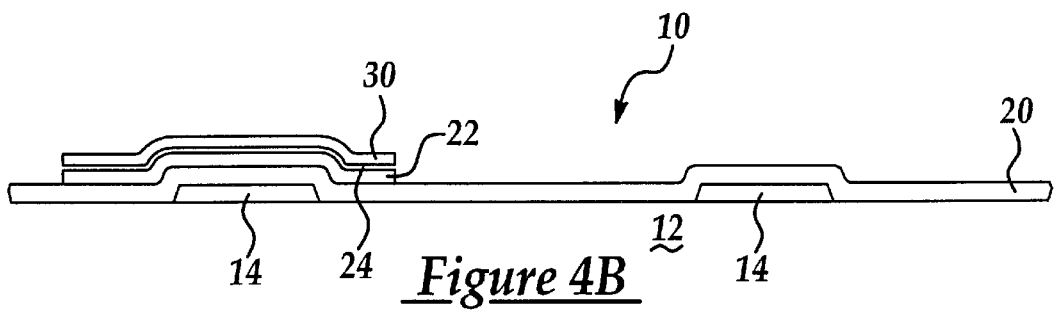

In the next step of fabrication, as shown in FIG. 4B, the continuous deposition of a gate silicon nitride layer 20, or a gate insulation layer; an intrinsic amorphous silicon layer 22; and an n+ doped amorphous silicon layer 24 is carried out on top of the plurality of gate buslines 14. The deposition processes can be carried out in the same cluster tool to enable the continuous deposition.

Figure 4C:
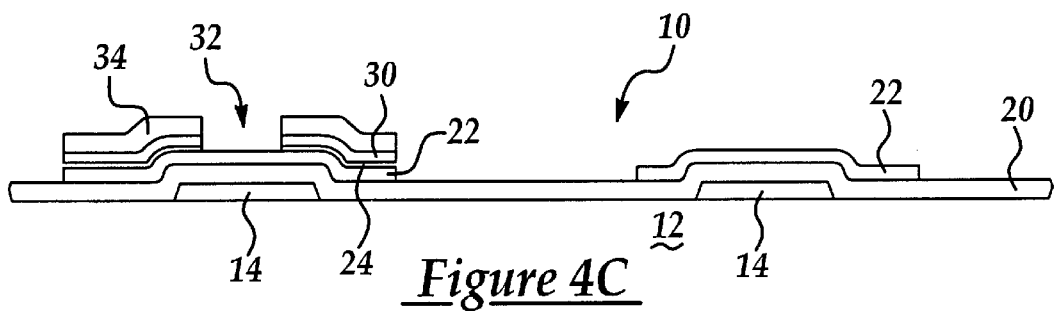

Immediately after the deposition of the n+ amorphous silicon layer 24, a source/drain metal thin film 30, or a metal mask layer is sputter deposited on top of the n+ amorphous silicon layer 24. The immediate sputtering process is one of the key factors in the present invention novel method which allows a clean interface to be maintained between the metal mask layer and the n+ amorphous silicon layer prior to any possible exposure to chemical contaminants and the growth of native oxide on the interface. After the S/D metal thin film 30 is deposited, the TFT island 32 and the S/D data lines 34, 36 are patterned by using a second mask simultaneously. This is shown in FIG. 4C.

Figure 4D:
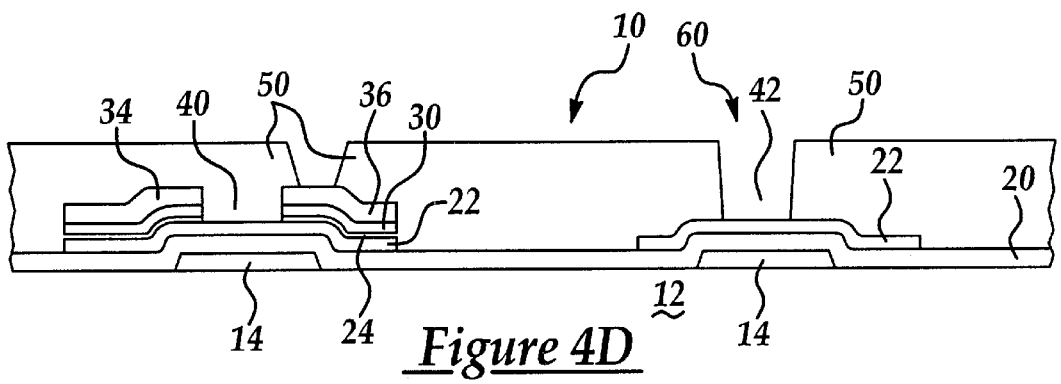

An upper metal, i.e., Metal 2 layer is then sputter deposited and then patterned by a third mask to form the data line 34, to etch the TFT back channel openings 40 and the $C_{st}$ structure 42. This is shown in FIG. 4D. A passivation layer 50 of a dielectric material is then blanket deposited on top of the TFT structure 10 to passivate the structure. The passivation layer 50 is then patterned by a fourth mask to expose the S/D metal 36 and the opening 42 for the storage capacitor 60. A transparent conductive electrode layer 62 is then sputter deposited on top of the structure 10 and patterned into an electrode by a fifth mask.

Figure 4E:
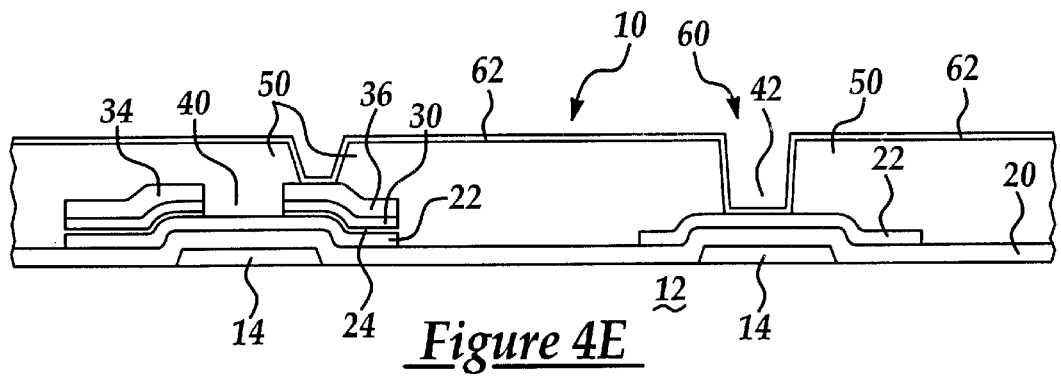
Figure 5E:
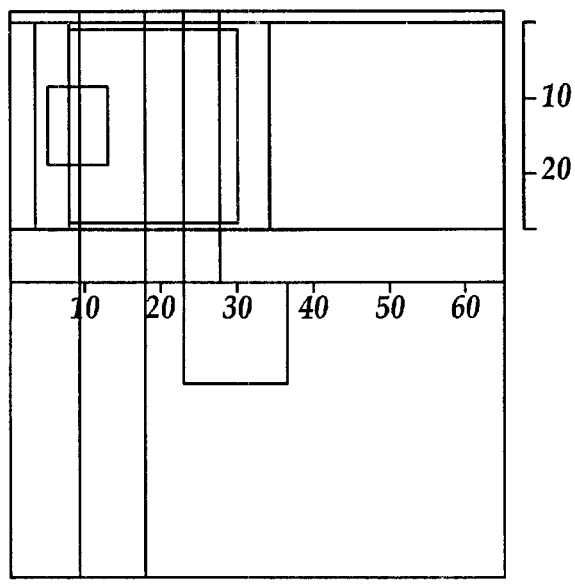

The corresponding plane views of the mask layouts used in the present invention fabrication method are shown in FIGS. 5A~5E. For instance, FIG. 5A shows the mask for the Metal 1 layer, corresponding to FIG. 4A. FIG. 5B illustrates the mask for the island/metal mask which corresponds to the structure shown in FIG. 4B. FIG. 5C shows the mask layout for the Metal 2 layer which corresponds to the cross-sectional view of FIG. 4C. FIG. 5D shows the mask layout for the passivation layer, corresponds to FIG. 4D. FIG. 5E shows a mask layout for the ITO electrode, corresponds to the cross-sectional view of FIG. 4E.

The metal mask layer 30 may be suitably deposited by a sputtering technique of a material selected from Al, Cu, Mo and Cr. The Metal 2 layer 34, 36 can be suitably sputter deposited of a bi-layer selected from Al/Cu, Al/Mo, Al/Ti, Al/V and Al/Cr. The plurality of gate buslines 14 which forms scan lines may be deposited of a bi-layer of about 2,000 Å Cr and about 2,000 Å Al. The metal mask layer 30 and the Metal 2 layer 34, 36 form data lines and may be deposited of about 500 Å Cr and about 6,000 Å Al bi-layer. The passivation layer 50 may be suitably deposited of a dielectric material such as SOG, BPSG or PSG. It has been found that the plurality of gate buslines 14 may have a thickness between about 500 Å and about 10,000 Å, while the source/drain metal layer may have a thickness between about 2,000 Å and about 12,000 Å, and preferably between about 4,000 Å and about 8,000 Å.

Figure 6:
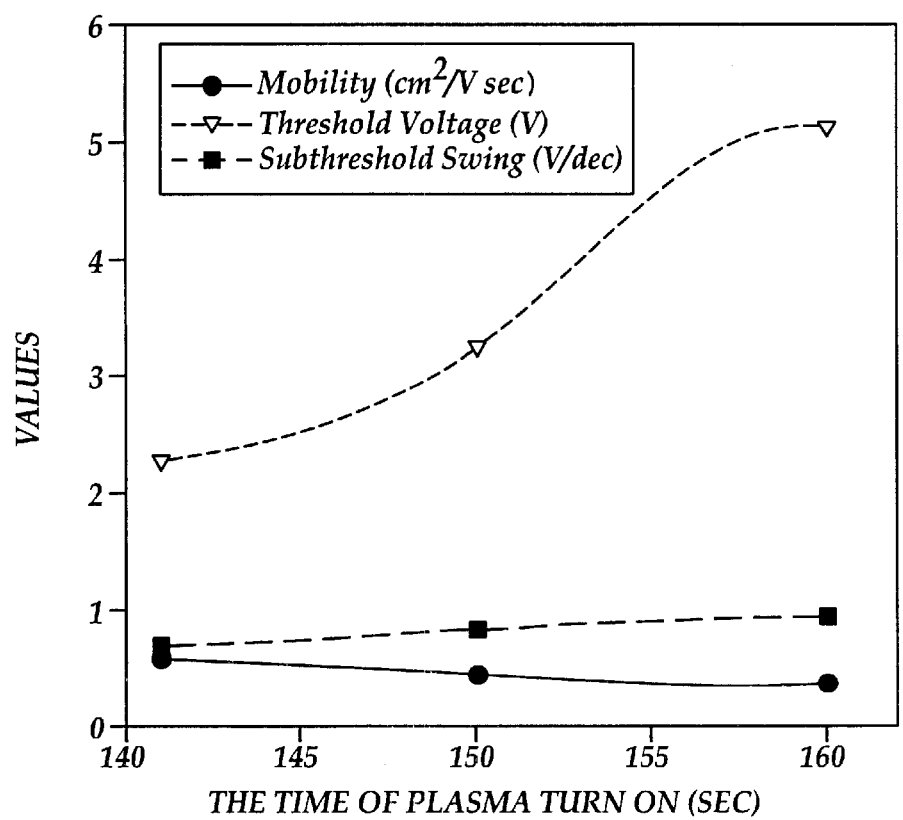
FIG. 6 is a graph illustrating the dependence of the TFT electrical properties on the oxygen plasma turn-on time for the present invention TFT array.

FIG. 6 is a graph illustrating the dependence of the present invention TFT electrical properties on the oxygen plasma turn-on time. It is seen that the plasma turn-on time is longer when the plasma damage is more severe. The severe damage leads to a large threshold voltage (Vth), a low mobility and a large sub-threshold swing (ss).

Figure 7:
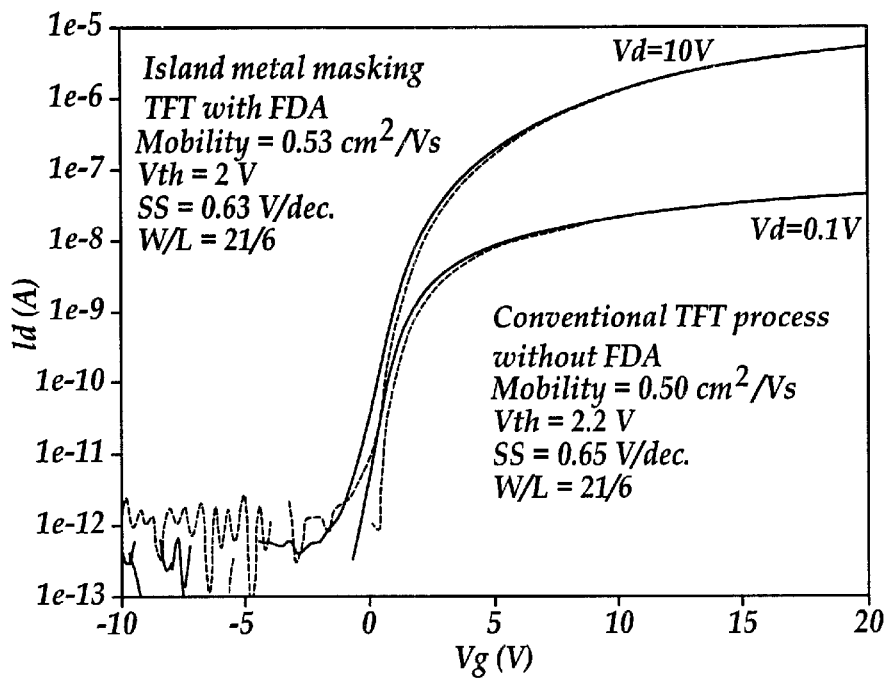
FIG. 7 is a graph illustrating a comparison between a conventional TFT process without fully dry ashing and a present invention island metal masking TFT with fully dry ashing.

FIG. 7 is a graph illustrating a comparison between a conventional TFT processed without the fully dry ashing process and a present invention island metal masking TFT processed with the fully dry ashing process. It is seen that the island metal masking TFT with the fully dry ashing damage indeed provides a plasma shield for the TFT device. This result is comparable to conventional TFT's without the fully dry ashing process.

Figure 8:
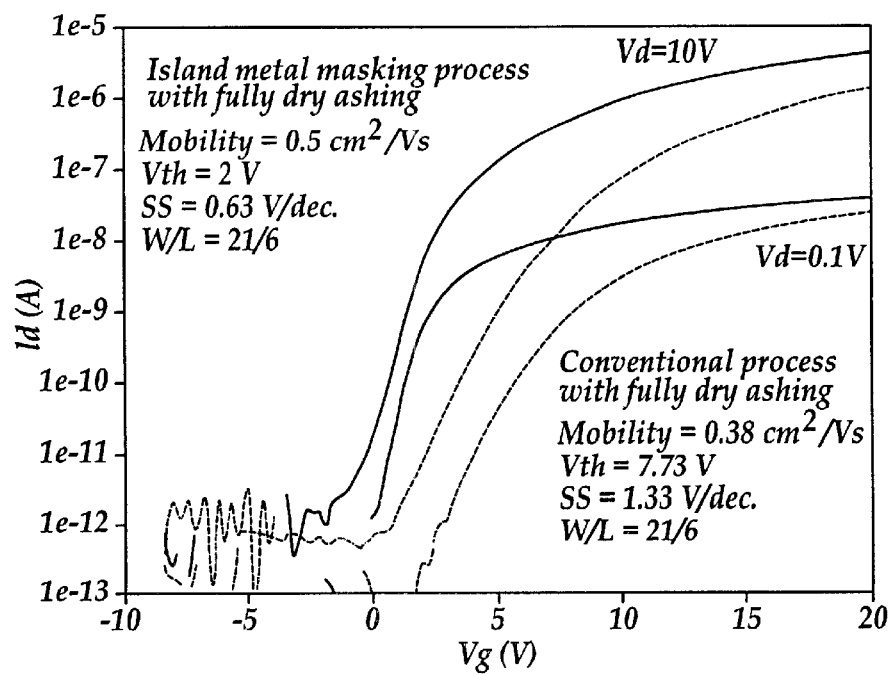
FIG. 8 is a graph illustrating the transfer curves of a hydrogenated amorphous silicon TFT fabricated by a conventional process and by a present invention island metal masking process.

FIG. 8 is a graph illustrating the transfer curves of the hydrogenated amorphous silicon TFT fabricated by a conventional process and by the present invention island metal masking process. The difference between the TFT's fabricated by the different processes are evident as the transfer curve of the conventional TFT showed poor Z-V properties under fully dry ashing process. In contrast, the island metal masking TFT is insensitive to the plasma damage.

Figure 9:
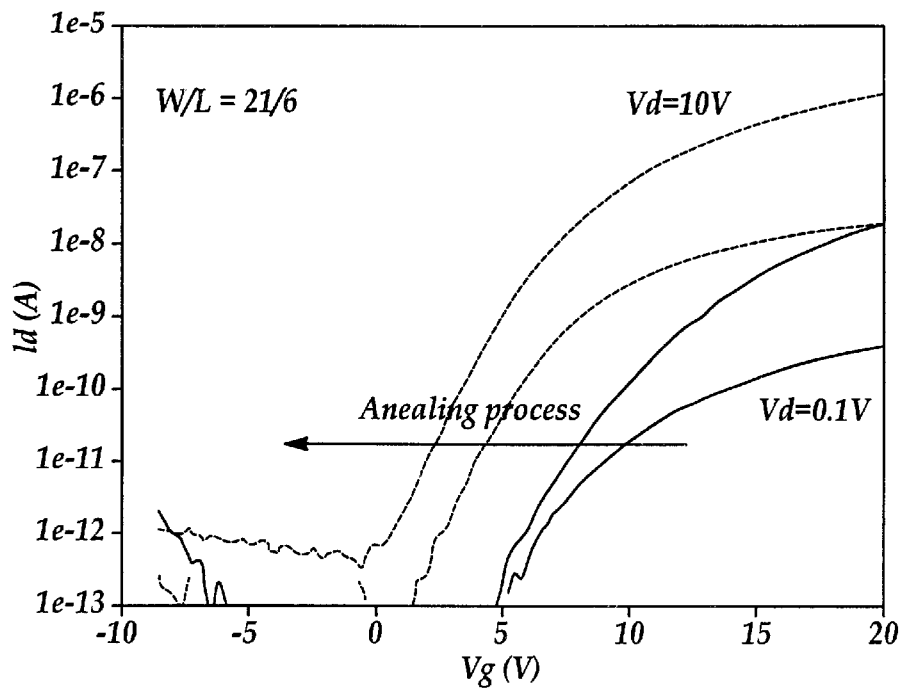
FIG. 9 is a graph illustrating the annealing process for a conventional TFT with fully dry ashing.
Figure 10:
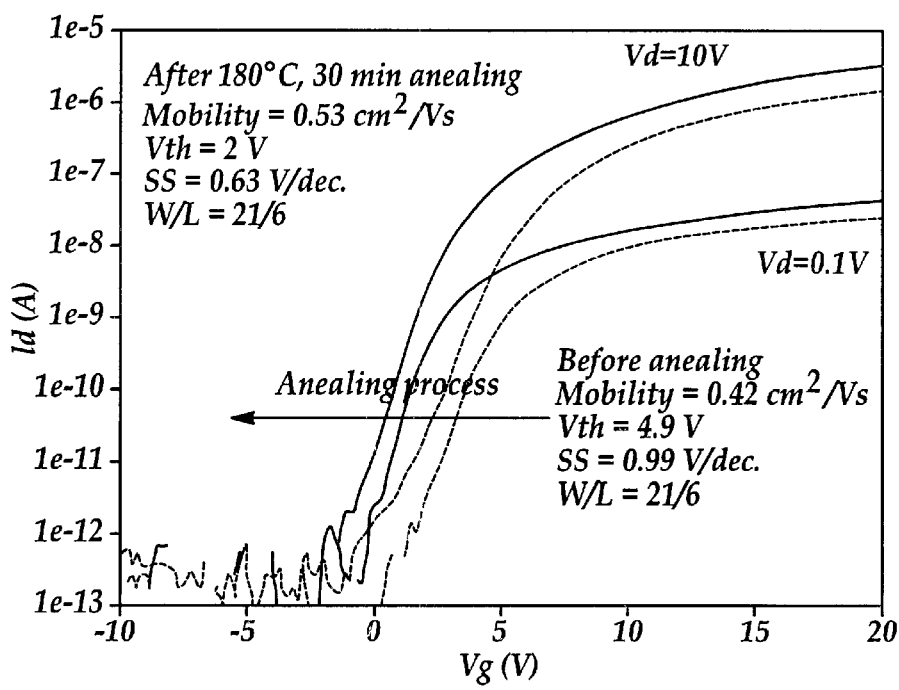
FIG. 10 is a graph illustrating the annealing process for a present invention island metal masking structure TFT with fully dry ashing.

FIG. 9 is a graph illustrating the annealing process for a conventional TFT fabricated with fully dry ashing process. FIG. 10 is a graph illustrating the annealing process for a present invention island metal masking structure TFT fabricated with fully dry ashing process. By comparing FIG. 9 with FIG. 10, it is seen that the island metal masking TFT should improve annealing results than the conventional TFT when the fully dry ashing plasma damage was applied.

The present invention novel method for fabricating a BCE type TFT array with reduced number of masks and devices formed have therefore been amply described in the above descriptions and in the appended drawings of FIGS. 4A~10.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

What is claimed is:

1. A method for fabricating TET array with reduced masks comprising the steps of:
   providing a substantially transparent ceramic panel,
   sputter depositing a first metal layer on said ceramic panel,
   forming a plurality of gate buslines on said ceramic panel with a first mask,
   depositing sequentially a gate nitride layer, an intrinsic amorphous silicon layer and an n+ doped amorphous silicon layer on top of said plurality of gate buslines,
   sputter depositing a metal mask layer for a source/drain metal on said n+ doped amorphous silicon layer,
   patterning and forming a TFT island and source/drain data lines simultaneous by a second mask,
   sputter depositing a second metal layer on top of said metal mask layer,
   patterning TFT channel and a storage capacitor by a third mask,
   etching a plurality of back channels,
   depositing a passivation layer and patterning said layer by a fourth mask, and
   sputter depositing a substantially transparent conductive electrode layer on top of said passivation layer and patterning electrodes by a fifth mask.

2. A method for fabricating TFT array with reduced masks according to claim 1, wherein the total number of masks required is not more than 5.

3. A method for fabricating TFT array with reduced masks according to claim 1, wherein said metal mask layer is sputter deposited immediately after the deposition of said n⁺ doped amorphous silicon layer before said n⁺ doped amorphous silicon layer is substantially exposed to chemical contaminants or forms native oxide.

4. A method for fabricating TFT array with reduced masks according to claim 1 further comprising the step of providing a glass panel for depositing said plurality of gate buslines thereon.

5. A method for fabricating TFT array with reduced masks according to claim 1, wherein said metal mask layer is sputter deposited of a material selected from the group consisting of Al, Cu, Mo, Ti, V and Cr.

6. A method for fabricating TFT array with reduced masks according to claim 1, wherein said second metal layer is sputter deposited of a bi-layer selected from the group consisting of Al/Cu, Al alloy/Cu, Al/Mo, Al/Ti, Al/V and Al/Cr.

7. A method for fabricating TFT array with reduced masks according to claim 1, wherein said plurality of gate buslines forms scan lines and is deposited of a bi-layer of about 2,000 Å Cr and about 2,000 Å Al.

8. A method for fabricating TFT array with reduced masks according to claim 1, wherein said metal mask layer and said second metal layer form data lines and are deposited of about 500 Å Cr and about 6,000 Å Al bi-layer.

9. A method for fabricating TFT array with reduced masks according to claim 1, wherein said passivation layer is deposited of a material selected from the group consisting of SOG, BPSG and PSG.

10. A method for fabricating TFT array with reduced masks according to claim 1, wherein said conductive electrode layer is deposited of ITO (indium-tin-oxide).

* * * * *